United States Patent [19]

Swift et al.

[11] Patent Number: 5,425,406
[45] Date of Patent: * Jun. 20, 1995

[54] ASYMMETRIC TIRE TREAD WITH AN AQUACHANNEL

[75] Inventors: Douglas A. Swift, Hudson; John J. Taube, Tallmadge, both of Ohio

[73] Assignee: The Goodyear Tire & Rubber Company, Akron, Ohio

[*] Notice: The portion of the term of this patent subsequent to Feb. 7, 2009 has been disclaimed.

[21] Appl. No.: 29,840

[22] Filed: Mar. 11, 1993

[51] Int. Cl.⁶ ............... B60C 101/00; B60C 111/00
[52] U.S. Cl. .............................. 152/209 A; 152/209 R
[58] Field of Search .......... 152/209 R, 209 A, 209 D; D12/146–151

[56] References Cited

U.S. PATENT DOCUMENTS

| D. 324,839 | 5/1992 | Maxwell et al. | D12/147 |
| 4,700,762 | 10/1987 | Landers | 152/209 R |
| 4,953,604 | 9/1990 | Shepler et al. | 152/209 A |
| 5,002,109 | 3/1991 | Shepler et al. | 152/209 A |
| 5,178,699 | 1/1993 | Kakumu et al. | 152/209 R |

FOREIGN PATENT DOCUMENTS 0508090 10/1992 European Pat. Off. ........ 152/209 R

Primary Examiner—Adrienne Johnstone
Attorney, Agent, or Firm—Bruce J. Hendricks

[57] ABSTRACT

An asymmetric tire tread is divided circumferentially into first, second, and third zones. The edge between the second and third zone in the tire is in the center of an aquachannel.

5 Claims, 3 Drawing Sheets

ASYMMETRIC TIRE TREAD WITH AN AQUACHANNEL

BACKGROUND OF THE INVENTION

1. Field of Invention

This invention relates generally to a tire having a tread designed for high performance.

2. Description of the Prior Art

In automotive vehicles, proper traction between the tire and the road surface is necessary for effective operation of the vehicle. Under certain weather conditions, such as rain, the traction of the tire on the road surface can be impaired. For example, a vehicle traveling on a rain-soaked road surface at high speed can "hydroplane" and lose contact with the road surface altogether. For this reason, it is desirable that tires be able to channel water away from the footprint of the tire to ensure good traction between the tire and road surface. U.S. Pat. No. 5,176,766 discloses a tire tread designed to provide good traction on slippery road surfaces.

A second problem is that four-wheeled vehicles are usually fitted with identical tires at all four wheel positions even though the operating conditions and performance requirements at each wheel may be different. For example, the functions necessarily performed by each tire, such as steering, load bearing, and transmitting driving torque from the engine to the road surface are usually different at each wheel position.

U.S. Pat. No. 4,984,616 discloses tire/vehicle system for an automotive vehicle. Whereas the use of such tires on dry pavement has met with immense success, there is still unacceptable traction on wet surfaces.

SUMMARY OF THE INVENTION

The tires of the present invention have an asymmetric grooved tread. The tire treads are each divided circumferentially into three zones. The tire is characterized by one aquachannel located in the center of the edge between the second and third zones. In one embodiment, the tires of the present invention have a particular utility on the non-drive wheels of a vehicle.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENTS

Figure 1:
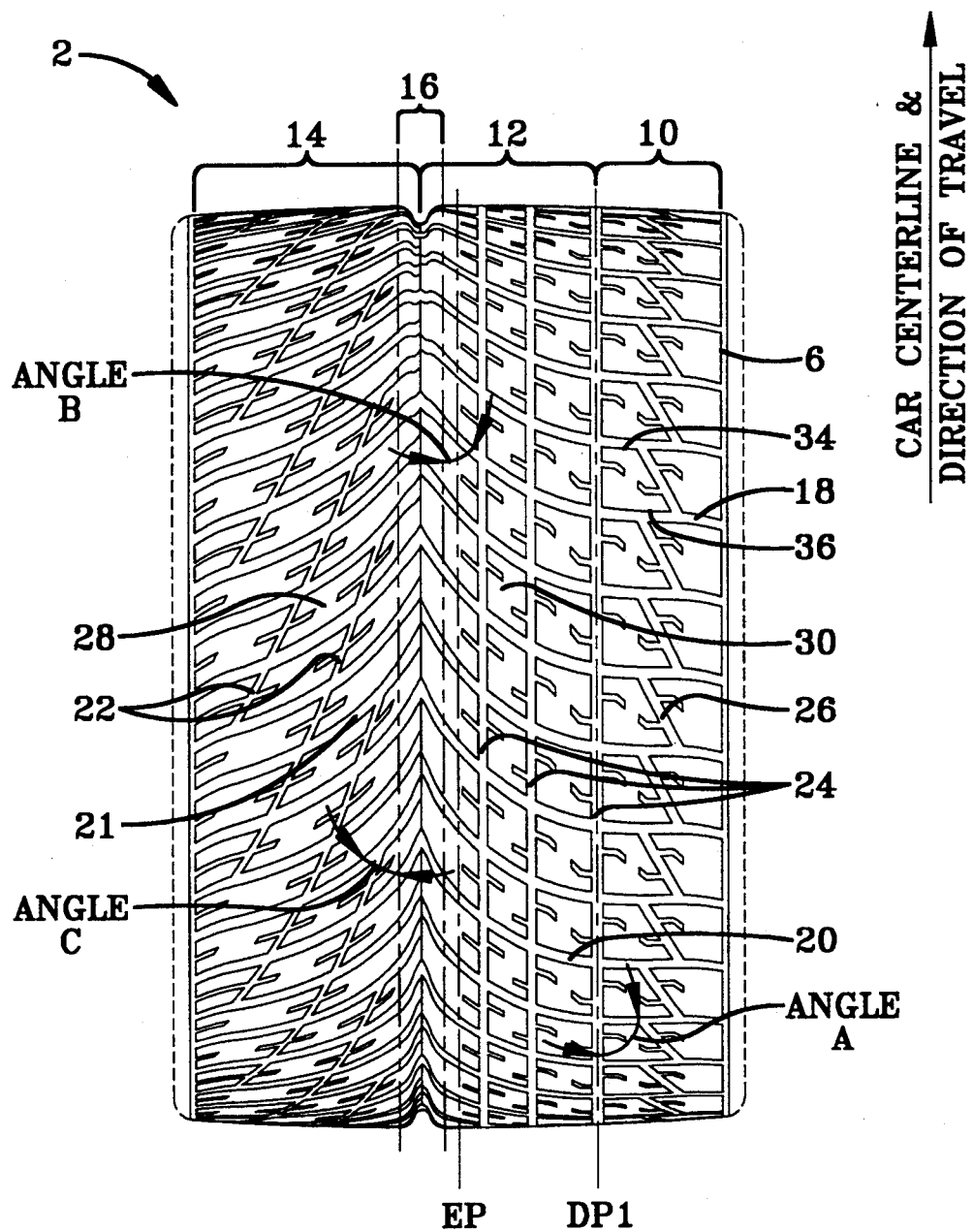
FIG. 1 is a plan view of a tire tread of one embodiment of the invention for use on the left side of a vehicle.

The invention also may be better understood in the context of the following definitions, which are applicable to both the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Equatorial plane (EP)" means the plane perpendicular to the tire's axis of rotation and passing through the center of its tread.

"Aquachannel" refers to an extra wide circumferential groove with angle (non-parallel), rounded groove walls designed specifically to channel water out of the footprint of the tire.

"Casing" means the carcass, belt structure, beads, sidewalls, and all other components of the tire excepting the tread and undertread. The casing may be news unvulcanized rubber or previously vulcanized rubber to be fitted with a new tread.

"Tread" means a molded rubber component which, when bonded to a tire casing, includes that portion of a tire that comes into contact with the road when the tire is normally inflated and under normal load.

"Tread width" means the arc length of the tread surface in the axial direction, that is, in a plane passing through the tire's axis of rotation.

"Footprint" means the contact patch or area of contact of the tire tread with a flat surface under normal load and pressure or under specified load, pressure and speed conditions.

"Net-to-gross ratio" means the ratio of the area of the tire tread rubber that makes contact with the road surface while in the footprint, divided by the area of the tread in the footprint, including non-contacting portions such as grooves.

"Tracking" means that in a tire/vehicle system where two tires are mounted on separate axles so that a front tire precedes a rear tire when the vehicle is being normally operated in a straight line, the rear tire contacts the same portions of the road surface as did the front tire.

"Groove" means an elongated void area in a tread that may extend circumferentially or laterally about the tread in a straight, curved, or zigzag manner. Circumferentially and laterally extending grooves sometimes have common portions. The "groove width" is equal to tread surface are occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Axial" and "axially" are used herein to refer to lines or directions that are substantially parallel to the axis of rotation of the tire.

"Radial" and "radially" are used herein to mean directions radially toward or away from the axis of rotation of the tire.

"Year-round" means a full calendar year through each season. For example, a snow tire is not designed for year-round use since it creates objectionable noise on dry road surfaces and is designed to be removed when the danger of snow is passed.

Figure 2:
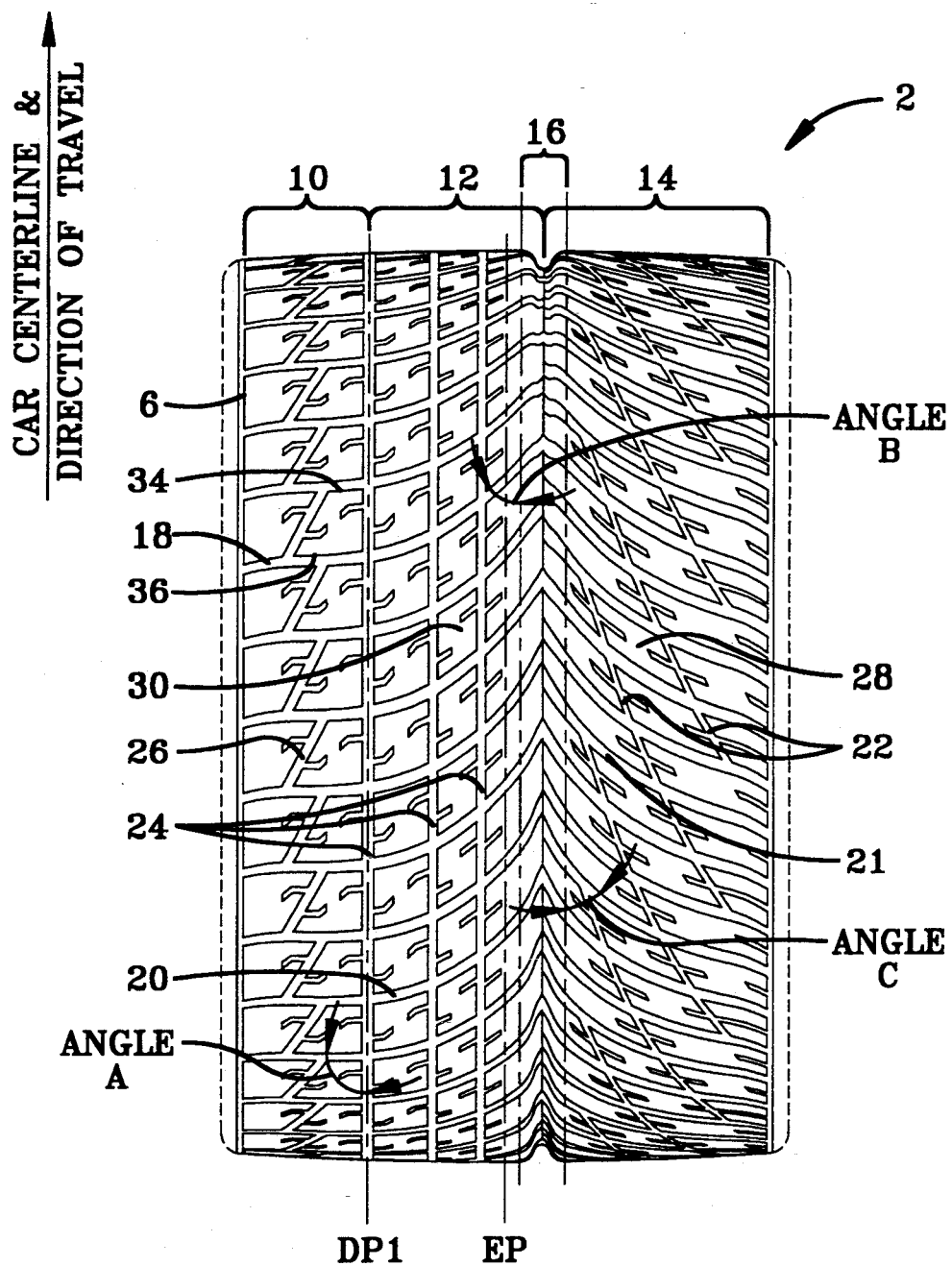
FIG. 2 is a plan view of a tire tread of one embodiment of the invention for use on the right side of a vehicle.

In the drawings, the same numerals are used for the same components or items in the several views. With particular reference now to FIGS. 1 and 2, there is illustrated a tire 2 according to the present invention. Throughout the present specification, a number of angles are described. All angles are measured in the intended forward direction of travel.

While the tires of FIGS. 1 and 2 are primarily designed for racing on wet tracks, the scope of the invention is not limited to race tires and has numerous applications including high performance tires.

With reference to FIGS. 1 and 2, each tire 2 has a tread 6 which may be formed into a tread pattern to provide certain performance objectives. The tire tread has first, second and third circumferentially extending zones 10, 12, 14. The first zone 10 is separated from the second zone 12 by a dividing plane DP1. The dividing plane is parallel to the tire's equatorial plane. The edge between the first and second zone and the edges between the second and third zone are parallel to the equatorial plane EP of the front tire. The edge between the second zone 12 and the third zone 14 is in the center of an aquachannel 16. The first zone 10 has a width between 20% and 30% of the tire width. In the preferred embodiment, the first zone 10 has a width equal to from 22 to 26% of the tire tread width. The second zone 12 has a width equal to from 30 to 40% of the tire tread width. Preferably, the second zone 12 has a width equal to from 32 to 36% of the tire width. The third zone 14 has a width equal to from 38 to 48 percent of the width of the tire. Preferably, the third zone 14 has a width equal to from 40 to 44% of the width of the tire.

The width in centimeters of the first zone 10, second zone 12 and third zone 14 may vary depending on the size of the tire. For example, the width of the first zone 10 may range from about 4 to 8 centimeters. Preferably, the width of the first zone 10 ranges from about 5 to 7 centimeters. The width of the second zone 12 may range from about 6 to 12 centimeters. Preferably, the width of the second zone 12 may range from about 8 to 10 centimeters. The width of the third zone 14 may range from about 7 to 13 centimeters. Preferably, the width of the third zone 14 ranges from about 9 to 12 centimeters.

The first zone 10 of the tire tread 2, 4 has substantially aligned lateral wide groove segments 18 extending across the width of the first zone. The centerlines of these lateral wide groove segments, over a majority of their length in the first zone, form an angle between 70 degrees and 90 degrees, and preferably between 80 and 85 degrees, when measured with respect to a plane located between the first zone and the second zone and which is parallel to the equatorial plane EP and measured in the intended forward direction of travel. See Angle A.

The second zone 12 has substantially aligned lateral wide groove segments 20 extending across the width of the second zone 12. The lateral wide groove segments, over a majority of their length in the second zone, have a centerline forming an angle between 25 degrees and 40 degrees , and preferably from 29 degrees to 35 degrees when measured at the point where the centerline merges with the aquachannel 16 and measured in the intended forward direction of travel. See Angle B. The lateral wide grooves 18 of the first zone 10 merge into the lateral wide grooves 20 of the second zone 12.

The third zone 14 has substantially aligned lateral wide groove segments 21 extending across the width of the third zone 14. The lateral wide groove segments, over a majority of their length in the third zone, have a centerline forming an angle between 25 degrees and 40 degrees, and preferably between 30 degrees to 36 degrees, when measured at the point where the centerline merges with the aquachannel 16 and measured in the intended forward direction of travel. See Angle C.

With reference to FIGS. 1 and 2, the tire tread 2, 4 has other wide grooves 22, 24, 26 which intersect the lateral wide grooves 20, 21 to form blocks 28, 30, 32. The wide grooves 22 in the third zone 14 form an angle between 10 degrees and 35 degrees, and preferably between 14 and 28 degrees, with a plane in the third zone 14 which is parallel to the equatorial plane EP. The other wide grooves 24 in the second zone 12 form an angle between 0 degrees and 10 degrees, preferably 0 degrees, with a plane in the second zone 12, which is parallel to the equatorial plane EP. The wide grooves 26 in the first zone 10 from and angle between 10 degrees and 40 degrees, and preferably between 15 and 30 degrees, with a plane in the first zone 10 which is parallel to the equatorial plane EP.

The blocks 32 in the first zone 10 have a leading edge 34 and a trailing edge 36. The leading edge 34 of the blocks contacts the road surface prior to the trailing edge of such blocks when the tire is rotating in its forward direction. The trailing edge 36 of the blocks 32 in the first zone of the tire 2, 4 is wider than the leading edge 34 of such blocks. In the preferred embodiment, the tires are free-rolling, as opposed to driven, and are the most important tires for braking. The trailing edge of the blocks assist in improving longitudinal traction during deceleration.

Tread designs utilized on the tire tread 2, 4 which utilize an aquachannel 16 tend to disperse water from the footprint to the shoulder area of the tire to help prevent hydroplaning.

Figure 3:
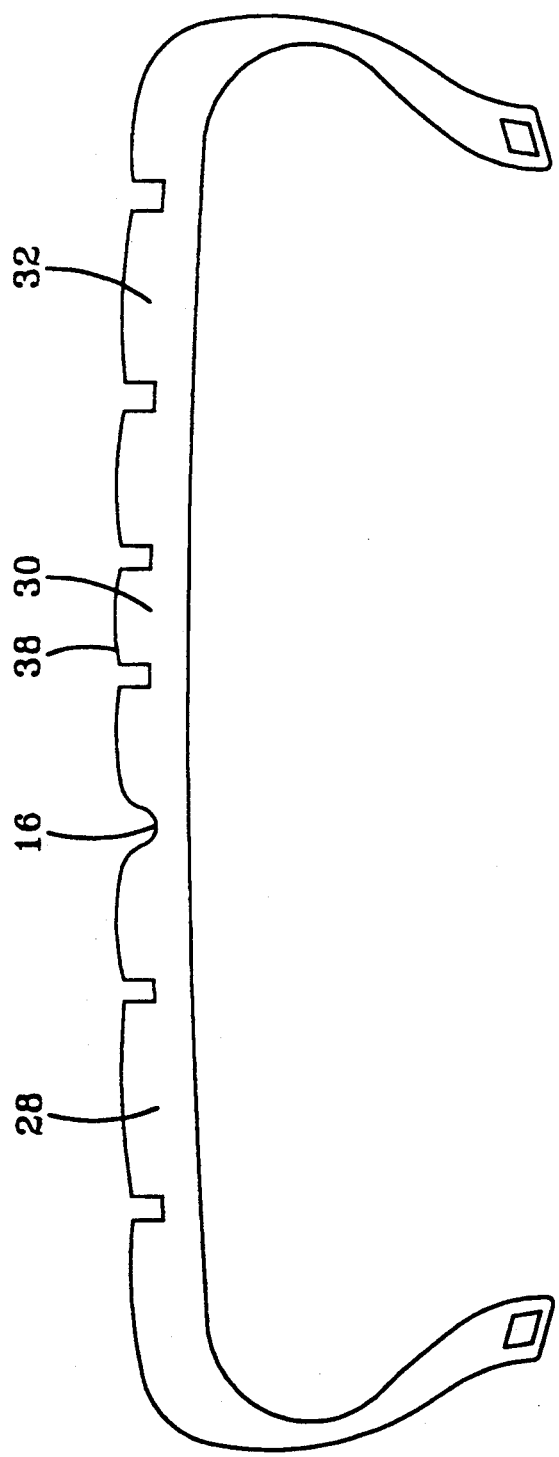
FIG. 3 is a cross-sectional view of a tire tread according to one embodiment of the invention.

With reference to FIGS. 1–3, the tires are further characterized varying net-to-gross ratios in each of the zones. The tread's net-to-gross ratio must be low enough to ensure that the tread's void areas can accommodate any water on the road surface. With reference to FIG. 3, when the single aquachannel 16, grooves and other void areas are properly sized, water is channeled out of the footprint by the void areas enabling the radially outermost surface 38 of the tread blocks 28, 30, 32 to make contact with the road surface. The radially outermost surface 38 of the blocks are convexly curved in the radially outward direction. In the preferred embodiment, this curvature in the axial direction only; the circumferential direction has no curvature apart from the usual curvature associated with a round tire. The curvature of the surface of the element helps move water from the center of the block to the tread groove. The curvature shown in FIG. 3 is exaggerated for clarity. This crowning helps prevent water being trapped between the block and the road surface.

On the other hand, if the tire tread has a net-to-gross ratio that is too low, tire traction, especially peak traction, and treadwear will be lowered. With reference to FIGS. 1 and 2, in a tire tread with a low net-to-gross ratio, the blocks 28, 30, 32 of the tread must bear a correspondingly greater percentage of the vehicle load. This higher loading of individual tread blocks lowers the treadwear of the tire. Additionally, blocks in a low net-to-gross ratio tread deflect more due to the higher loading. This additional deflection is undesirable for handling, especially under hard cornering.

The tire tread of the present invention have three zones which vary in their net-to-gross ratios. The first zone 10 of the tire 2, 4 tread has a net-to-gross ratio between 65 and 75% with the preferred net-to-gross ratio ranging from 68 to 72%. The net-to-gross ratio of the second zone 12 of the tire 2, 4 tread is between 54% and 64% with the net-to-gross of from about 56 to 59% being preferred. Preferably, the net-to-gross ratio of the second zone 12 is at least 5% less than the net-to-gross ratio of the first zone 10. The third zone 14 of the tire 2, 4 tread has a net-to-gross ratio between 54 and 64 percent. Preferably, the net-to-gross ratio of the third zone 14 ranges from about 56 to 61%.

What is claimed is:

1. An asymmetric tire tread when in an annular configuration for a tire comprising first, second, and third circumferentially extending zones, the zones having edges which are parallel to the equatorial plane of the tire, said edge between the second and third zone being in the center of an aquachannel, (1) said first zone having a width of between 22 to 26 percent of the width of the front tire tread, said first zone having a net-to-gross ratio between 65 and 75 percent and a width between 4 and 8 centimeters with substantially aligned lateral wide groove segments extending thereacross, and along a majority of its length in the first zone each lateral wide groove having a centerline which forms an angle, between 80 degrees to 85 degrees with respect to a plane located between the front zone and second zone and parallel to the equatorial plane of the front tire, said first zone also having additional grooves which intersect said lateral wide grooves to form blocks;

(2) the second zone having a width of between 32 to 36 percent of the width of the front tire tread said second zone having a net-to-gross ratio between 54 percent and 64 percent and width between 6 and 12 centimeters with substantially aligned lateral wide groove segments extending thereacross, along the majority of its length in the second zone, each lateral wide groove having a centerline being oriented such that the centerline forms an angle of between 29 degrees and 35 degrees at the point where the centerline merges with the aquachannel and the groove continues to merge into the lateral wide grooves of the first zone, said second zone also having additional grooves which intersect said lateral wide grooves to form blocks;

(3) said third zone having a width of between 40 to 44 percent of the width of the front tire tread, said third zone having a net-to-gross ratio between 54 and 64 percent and substantially laterally extending grooves extending thereacross outward from said aquachannel to the nearest tread edge, each laterally extending groove having a centerline which is oriented such that the centerline forms an angle of between 30 degrees and 36 degrees at the point where the centerline merges with the aquachannel, said third zone also having additional grooves which intersect said lateral wide grooves to form blocks.

2. The tire tread of claim 1 wherein the net-to-gross ratio of the first zone ranges from 68% to 72%, the net-to-gross ratio of the second zone ranges from 56% to 59%, and the net-to-gross ratio of the third zone ranges from 56% to 61%.

3. The tire tread of claim 1 wherein the width of the first zone ranges from 4 to 8 cm., the width of the second zone ranges from 6 to 12 cm., and the width of the third zone ranges from 7 to 13 cm.

4. The tire tread of claim 1 wherein the width of the first zone ranges from about 5 to 7 cm., the width of the second zone ranges from 8 to 10 cm., and the width of the third zone ranges from 9 to 12 cm.

5. The tire tread of claim 1 wherein said blocks in the first zone have a leading edge and a trailing edge and said trailing edge is wider than the leading edge.

* * * * *